(12) United States Patent
Lev et al.

(10) Patent No.: US 8,172,282 B2
(45) Date of Patent: May 8, 2012

(54) COMPUTING DEVICE LATCHING ASSEMBLY

(75) Inventors: Jeffrey A. Lev, Tomball, TX (US);
Dustin L. Hoffman, Cypress, TX (US);
Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

(21) Appl. No.: 12/008,743

(22) Filed: Jan. 14, 2008

(65) Prior Publication Data
US 2009/0179435 A1    Jul. 16, 2009

(51) Int. Cl.
*E05C 1/12*    (2006.01)

(52) U.S. Cl. ........ 292/164; 292/163; 292/110; 361/681; 361/683; 361/679.55

(58) Field of Classification Search .................. 292/164, 292/163, 56, 60, 95, 110, 121; 361/683, 361/681, 679.55, 679.57
See application file for complete search history.

(56) References Cited

U.S. PATENT DOCUMENTS

| | | | |
|---|---|---|---|
| 5,225,293 A | 7/1993 | Mitchell et al. | |
| 5,460,906 A | 10/1995 | Leon et al. | |
| 5,557,562 A | 9/1996 | Yoshiharu et al. | |
| 5,620,242 A | 4/1997 | Leon et al. | |
| 5,740,012 A * | 4/1998 | Choi | 361/679.39 |
| 6,108,196 A * | 8/2000 | Jung | 361/679.55 |
| 6,125,040 A * | 9/2000 | Nobuchi et al. | 361/726 |
| 6,211,648 B1 | 4/2001 | Chew | |
| 6,261,715 B1 | 7/2001 | Nakamura et al. | |
| 6,373,693 B1 * | 4/2002 | Seto et al. | 361/679.33 |
| 6,517,129 B1 * | 2/2003 | Chien et al. | 292/251.5 |
| 6,560,100 B1 | 5/2003 | Shin et al. | |
| 6,563,699 B1 * | 5/2003 | Choi | 361/679.09 |
| 6,724,616 B2 * | 4/2004 | Kuo et al. | 361/679.02 |
| 6,927,972 B1 | 8/2005 | Wang et al. | |
| 6,956,734 B2 | 10/2005 | Shin et al. | |
| 7,199,999 B2 | 4/2007 | Shin et al. | |
| 2010/0053857 A1 * | 3/2010 | Zhu et al. | 361/679.01 |

FOREIGN PATENT DOCUMENTS

| | | |
|---|---|---|
| JP | 08-106342 A | 4/1996 |
| JP | 2003-256082 A | 9/2003 |
| KR | 10-2000-0060316 A | 10/2000 |

OTHER PUBLICATIONS

International Search Report. Date of mailing May 28, 2009 for International Application No. PCT/US2008/084596. International Filing Date Nov. 25, 2008.

* cited by examiner

*Primary Examiner* — Carlos Lugo
*Assistant Examiner* — Mark Williams

(57) ABSTRACT

A computing device latching assembly comprises a latching member configured to releasably secure an accessory to a computing device, and a release mechanism actuatable to move the latching member from a locking position to an unlocked position and to cause the latching member to urge the accessory away from the computing device.

20 Claims, 5 Drawing Sheets

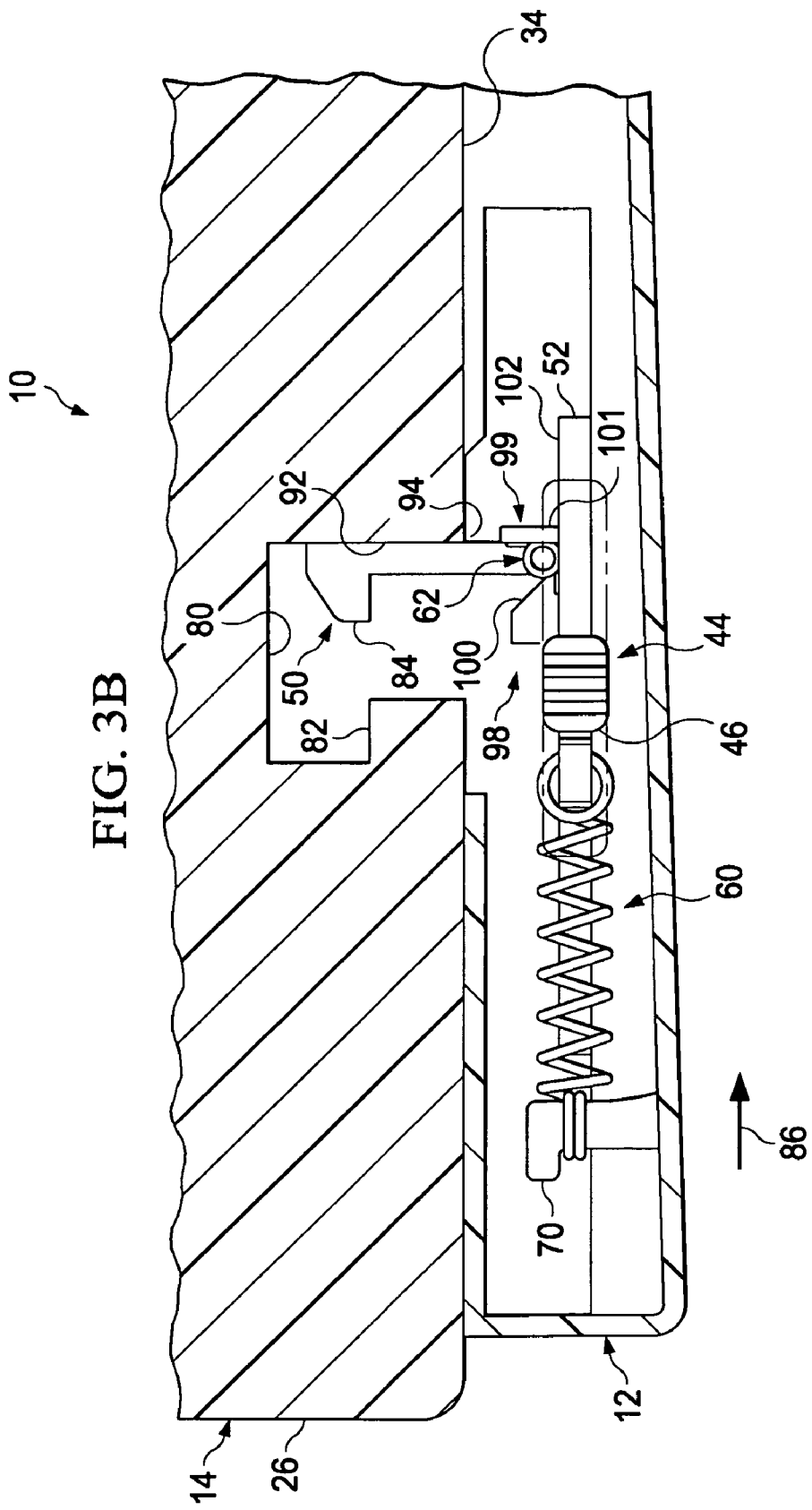

COMPUTING DEVICE LATCHING ASSEMBLY

BACKGROUND

Different types of accessories are configured to be releasably coupled to different types of computing devices. For example, one type of computing device is a laptop or notebook computer, and one type of accessory is a battery. One or more latching mechanisms are generally used to releasably secure the battery to the notebook computer. However, these latching mechanisms may be cumbersome to operate, especially for those with physical disabilities.

BRIEF DESCRIPTION OF THE DRAWINGS

For a more complete understanding of the present disclosure, and the objects and advantages thereof, reference is now made to the following descriptions taken in connection with the accompanying drawings in which:

FIGS. 3A-3C are diagrams illustrating various locking/unlocking positions of the computing device latching assembly of FIGS. 1 and 2.

DETAILED DESCRIPTION OF THE DRAWINGS

Various embodiments of the present disclosure and the advantages thereof are best understood by referring to FIGS. 1-3C of the drawings, like numerals being used for like and corresponding parts of the various drawings.

Figure 1:
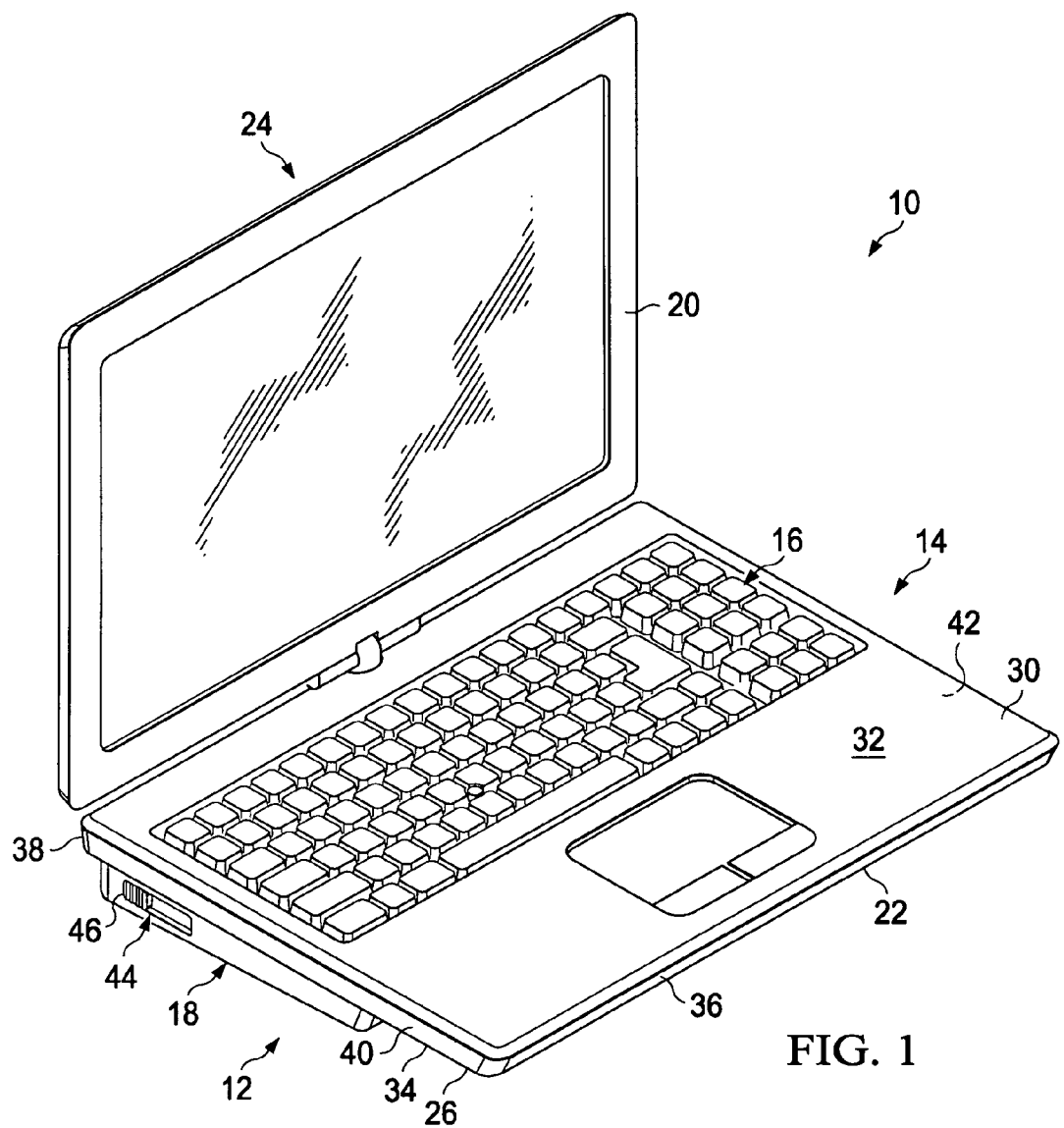
FIG. 1 is a diagram illustrating an embodiment of a computing device latching assembly.

FIG. 1 is a diagram illustrating an embodiment of a computing device latching assembly 10. In the embodiment illustrated in FIG. 1, assembly 10 is used to releasably secure an accessory 12 to a computing device 14. In the embodiment illustrated in FIG. 1, computing device 14 comprises a laptop or notebook computer 16; however, it should be understood that computing device 14 may comprise other types of devices such as, but not limited to, a cellular telephone, a tablet computer, a gaming device or any other type of portable or non-portable computing device. In FIG. 1, accessory 12 comprises a battery 18; however, it should be understood that accessory 12 may comprise other types of accessories configured to be releasably secured to a particular type of computing device 14 such as, but not limited to, a fan or cooling unit, a disc drive, a camera, and a docking station.

In the embodiment illustrated in FIG. 1, computing device 14 comprises a display member 20 rotatably coupled to a base member 22. Display member 20 and base member 22 each comprise a housing 24 and 26, respectively, formed having a number of walls. For example, housing 26 comprises a top wall 30 forming a working surface 32, a bottom wall 34, a front wall 36, a rear wall 38, and a pair of side walls 40 and 42. In the embodiment illustrated in FIG. 1, accessory 12 is releasably coupled to an exterior surface of computing device 14. For example, in FIG. 1, battery 18 is releasably secured to bottom wall 34 of housing 26. However, it should be understood that accessory 12 may be releasably secured to other locations of base member 22 and/or display member 20.

In the embodiment illustrated in FIG. 1, assembly 10 comprises a release mechanism 44 actuatable by a user for releasing and/or otherwise disengaging accessory 12 from computing device 14. In FIG. 1, release mechanism 44 comprises a slideable button 46 that is actuatable to cause disengagement of battery 18 from computing device 14 and also cause battery 18 to be urged away from computing device 14 (or computing device 14 urged away from battery 18). Thus, in some embodiments, in response to actuation of release mechanism 44, accessory 12 is unlocked and/or otherwise disengaged from computer device 14, and accessory 12 and computing device 14 are automatically moved away from each. Thus, embodiments of assembly 10 facilitate easy and ready removal and/or separation of accessory 12 from computing device 14. In the embodiment illustrated in FIG. 1, a single release mechanism 44 is illustrated. However, it should be understood that additional release mechanisms 44 may be located on accessory 12 (e.g., an additional release mechanism 44 located on a side of accessory 12 corresponding to side wall 42 of housing 26). Further, in FIG. 1, release mechanism 44 is illustrated as being disposed on and/or otherwise forming part of accessory 12; however, it should be understood that release mechanism 44 may alternatively be located on computing device 14.

Figure 2:
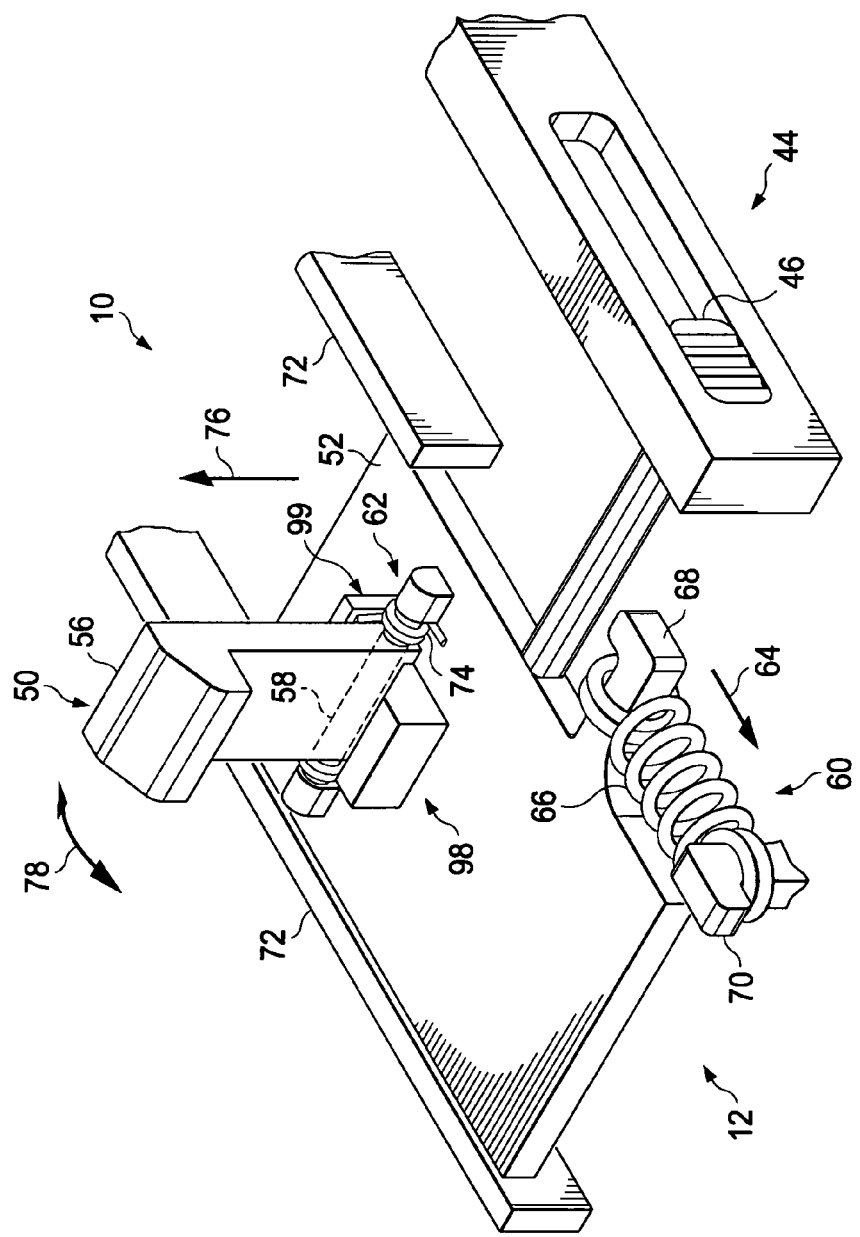
FIG. 2 is a diagram illustrating an enlarged view of a portion of the computing device latching assembly of FIG. 1.

FIG. 2 is a diagram illustrating an enlarged view of a portion of latching assembly 10. In FIG. 2, a housing of accessory 12 has been removed to better illustrate components of latching assembly 10 disposed within accessory 12. In the embodiment illustrated in FIG. 2, assembly 10 comprises a latching member 50 rotatably coupled to a support plate 52, which in turn is coupled to release mechanism 44 (e.g., coupled to button 46). In FIG. 2, latching member 50, support plate 52 and release mechanism 44 are illustrated as being disposed on and/or otherwise forming part of accessory 12; however, as discussed above, the location of latching member 50, support plate 52 and release mechanism 44 may be otherwise disposed (e.g., located on computing device 14 (FIG. 1)).

In the embodiment illustrated in FIG. 2, latching member 50 comprises an L-shaped or hook-shaped member 56 configured to releasably engage a portion of computing device 14 (FIG. 1) to releasably secure accessory 12 thereto. In FIG. 2, latching member 50 is rotatably coupled to support plate 52 via a hinge 58; however, it should be understood that other types of mechanisms may be used to rotatably couple latching member 50 to support plate 52.

In the embodiment illustrated in FIG. 2, assembly 10 comprises biasing mechanisms 60 and 62. Biasing mechanism 60 biases support plate 52 and latching member 50 in the direction indicated by arrow 64 to a locking position relative to accessory 12 (support plate 52 and latching member 50 are illustrated in the locking position in FIG. 2). In FIG. 2, biasing mechanism 60 comprises a spring 66 coupled at one end to a portion 68 of support plate 52 and to a non-moving portion 70 of accessory 12. In FIG. 2, support plate 52 is disposed within a groove and/or track 72 to facilitate slideable movement of support plate 52 in the direction indicated by arrow 64 and in a direction opposite thereof. Biasing mechanism 62 biases latching member 50 to a locking orientation relative to support plate 52 (latching member 50 is illustrated in the locking orientation in FIG. 2). For example, in the embodiment illustrated in FIG. 2, biasing mechanism 62 comprises a torsion spring 74 coupled to and/or otherwise embodied with hinge 58 such that latching member 50 is biased to a generally vertical direction indicated by arrow 76 relative to support plate 52 to facilitate engagement of latching member 50 with a portion of computing device 14 to releasably secure accessory 12 to computing device 14. Thus, in operation, latching member 50 is rotatable relative to support plate 52 in the directions indicated by arrow 78, and biasing mechanism 62 biases latching member 50 to a latching orientation such that latching member 50 is positioned in generally perpendicular direction (corresponding to direction indicated by arrow 76) relative to support plate 52. In the embodiment illustrated in FIG. 2, assembly 10 also comprises stops 98 and 99 for limiting an amount of rotational movement of latching member 50 relative to support plate 52 in the directions indicated by arrow 78. The operation of stops 98 and 99 in cooperation with latching member 50 is more fully described in connection with FIGS. 3A-3C.

Figure 3A:
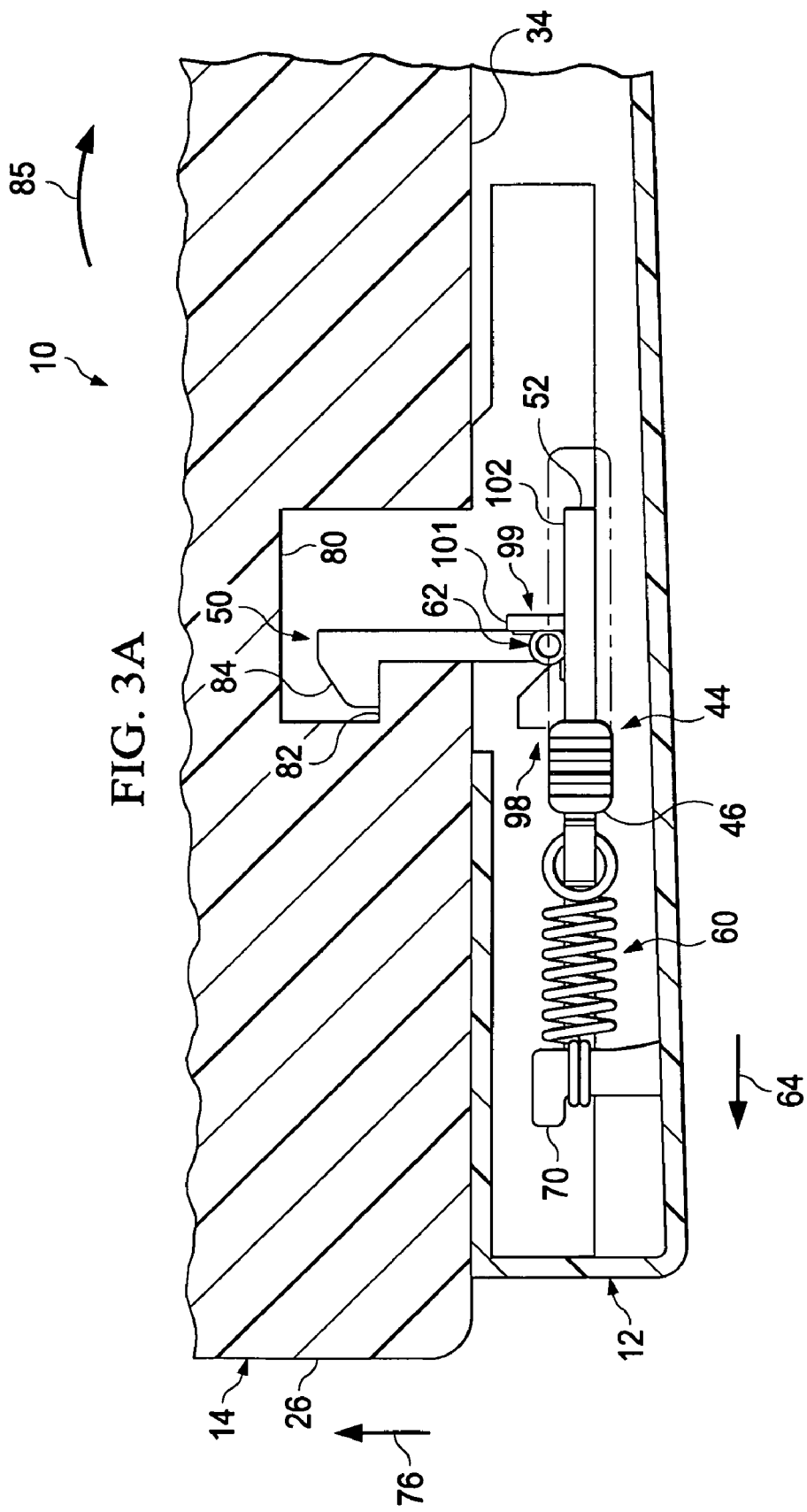
Figure 3C:
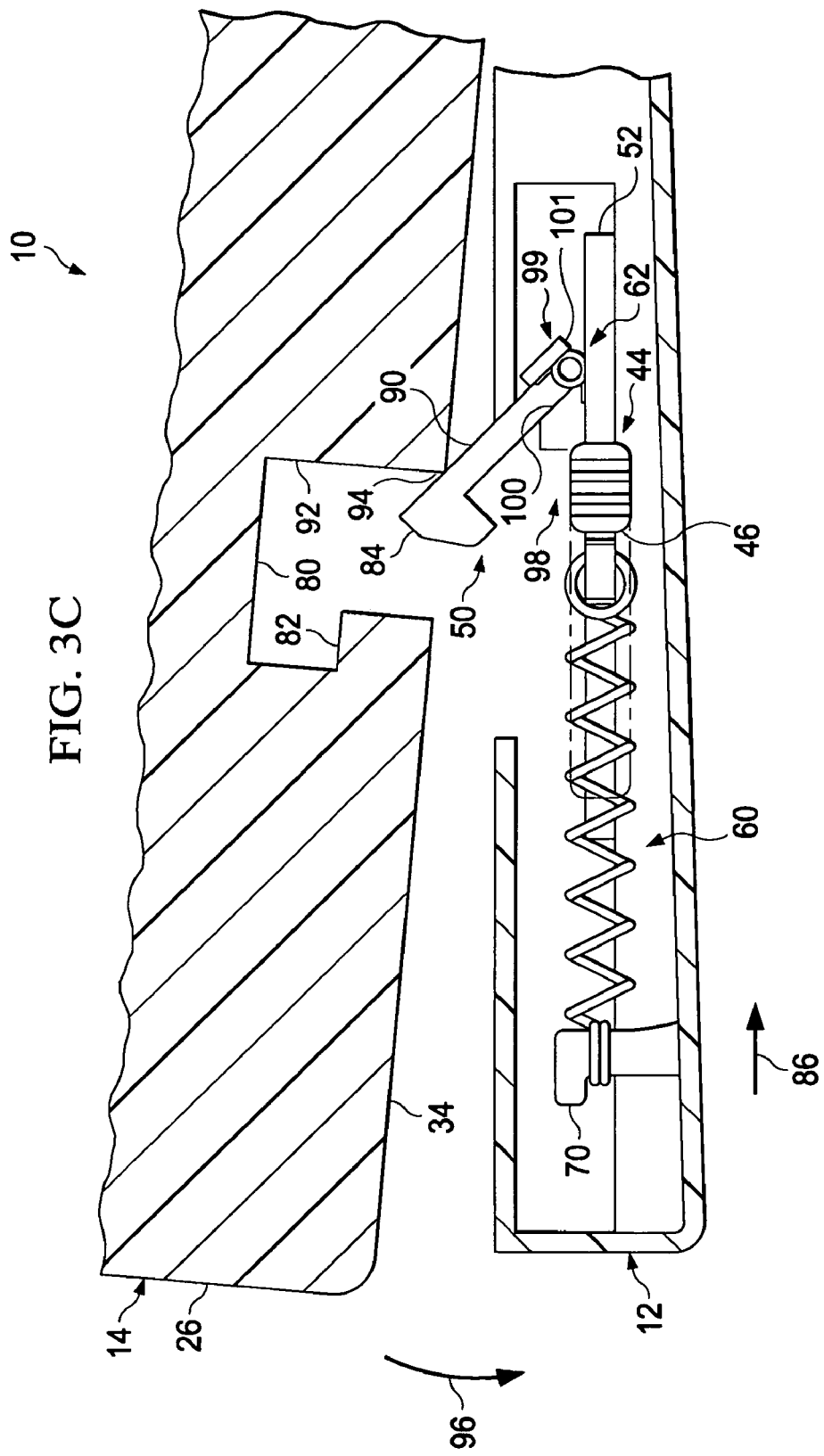

FIGS. 3A-3C are diagrams illustrated assembly 10 in various locking/unlocking positions. In FIGS. 3A-3C, a position of release mechanism 44 is illustrated corresponding to various positions of support plate 52/latching member 50 to facilitate a better understanding of the actuation of release mechanism 44 with the operation of support plate 52 and/or latching member 50. For example, referring to FIG. 3A, release mechanism 44 and latching member 50 are shown in a locking position relative to computing device 14.

In FIGS. 3A-3C, computing device 14 comprises an opening 80 disposed on bottom wall 34 of housing 26 having a ledge 82 engageable by a hook portion 84 of latching member 50 to releasably secure accessory 12 to computing device 14. Biasing mechanism 60 biases support plate 50 and latching member 50 in the direction indicated by arrow 64 (FIGS. 2 and 3A) toward the locking position illustrated in FIG. 3A. Further, biasing mechanism 62 biases latching member 50 to a locking orientation corresponding to the direction indicated by arrow 76 (FIGS. 2 and 3A). Thus, referring to FIG. 3A, assembly 10, and release mechanism 44, are illustrated in a locking position with latching member 50 engaged with ledge 82 to secure accessory 12 to computing device 14. In the embodiment illustrated in FIG. 3A, stop 99 limits rotatable movement of latching member 50 in the direction indicated by arrow 85. For example, in some embodiments, stop 99 comprises a plate 101 coupled to a side portion of latching member 50 facing the direction indicated by arrow 85 that is positioned to engage and/or or otherwise contact an upper surface 102 of support plate 52 to limit rotational movement of latching member 50 in the direction indicated by arrow 85. However, it should be understood that other types of limiting elements may be used. Thus, in operation, stop 99 limits rotational movement of latching member 50 away from ledge 82 when latching member 50 is located in the locking position.

Referring to FIG. 3B, release mechanism 44, latching member 50 and support plate 52 are illustrated in an unlocked position relative to accessory 12/computing device 14. For example, in FIG. 3B, button 46 has been actuated and/or moved in the direction indicated by arrow 86 from the locking position (FIG. 3A), thereby causing corresponding movement of support plate 52 and latching member 50 to an unlocked position relative to a computing device 14 such that latching member 50 is in a position disengaged from ledge 82. Thus, in the unlocked position, latching member 50 is in a position of disengagement relative to computing device 14 such that latching member 50 is free or clear of ledge 82 to facilitate removal of accessory 12 relative to computing device 14.

Referring to FIG. 3C, release mechanism 44 has been further actuated in the direction indicated by arrow 86 from the position illustrated in FIG. 3B, thereby causing corresponding movement of support plate 52 in the direction indicated by arrow 86 beyond the unlocked position illustrated in FIG. 3B. In operation, in response to actuation of release mechanism 44 to the position illustrated in FIG. 3C, a surface 90 of latching member 50 contacts a wall 92 and/or corner 94 of opening 80, thereby causing latching member 50 to rotate relative to support plate 52 in the direction indicated by arrow 96. In the embodiment illustrated in FIG. 3C, stop 98 limits the amount of rotational movement of latching member 50 relative to support plate 52 in the direction indicated by arrow 96. For example, in some embodiments, stop 98 comprises an angled surface or step 100 that limits the rotational movement of latching member 50 in the direction indicated by arrow 96. Thus, for example, in response to actuation of release mechanism 44 from the position illustrated in FIG. 3B to the position indicated in FIG. 3C, latching member 50 rotates and/or folds down in the direction indicated by arrow 96 until reaching stop 98 and thereby urging accessory 12 away from computing device 14 in response to contact of surface 90 of latching member 50 with wall 92/corner 94 of opening 80. For example, in some embodiments, when button 46 is located at a position intermediate to the positions illustrated in FIGS. 3B and 3C, rotation of latching member 50 in the direction of arrow 96 is stopped and continued actuation of button 46 in the direction indicated by arrow 86 causes surface 90 of latching member 50 to urge against wall 92 and/or edge 94 of opening 80, thereby urging and/or otherwise pushing away accessory 12 from computing device 14. After release of release mechanism 44, biasing mechanism 60 causes latching member 50 and support plate 52 to return to a locking position to facilitate re-attachment of accessory 12 to computing device 14.

Thus, embodiments of assembly 10 enable accessory 12 to be easily removed from computing device 14 by urging accessory 12 and computing device 14 away from each other. Further, for accessories 12 and/or computing devices 14 needing at least two latching members 50 to secure accessory 12 to computing device 14, each latching member 50 may be actuated using a single hand while the latching members 50 urge accessory 12 away from computing device 14 independently of a user pulling and/or otherwise separating accessory 12 from computing device 14.

What is claimed is:

1. A computing device latching assembly, comprising:
   a latching member rotatably coupled to a support plate and biased to a locking orientation relative to the support plate by a biasing force, the latching member including a hook portion on one side thereof and a surface on an opposite side thereof, and the hook portion configured to engage an opening and releasably secure an accessory to a computing device; and
   a release mechanism coupled to the support plate to slide the support plate and move the latching member from a locking position to an unlocked position and a position beyond the unlocked position wherein, in response to contact of the surface of the latching member with a boundary of the opening when the latching member is moved from the locking position to the unlocked position and contact of the latching member with a stop of the support plate when the latching member is moved to the position beyond the unlocked position, the latching member is rotated in a first direction against the biasing force and is limited in rotation in the first direction by the stop such that the contact of the latching member with the boundary of the opening and the contact of the latching member with the stop urges the accessory away from the computing device in the first direction.

2. The latching assembly of claim 1, wherein the latching member is disposed on the accessory, and the opening is formed in the computing device.

3. The latching assembly of claim 1, wherein the release mechanism is disposed on the accessory.

4. The latching assembly of claim 1, wherein the latching member is rotatably coupled to the accessory and configured to engage a portion of the computing device to releasably secure the accessory to the computing device.

5. The latching assembly of claim 1, wherein the release mechanism is moved from a first position to a second position to slide the support plate and move the latching member from the locking position to the unlocked position, and wherein the release mechanism is moved from the second position to a third position to slide the support plate and move the latching member from the unlocked position to the position beyond the unlocked position, and rotate the latching member in the first direction, contact the stop of the support plate, and urge the accessory away from the computing device in the first direction.

6. The latching assembly of claim 1, wherein the accessory comprises a battery.

7. The latching assembly of claim 1, further comprising:
a first biasing mechanism configured to bias the latching member to the locking position; and
a second biasing mechanism configured to provide the biasing force and bias the latching member to the locking orientation.

8. The latching assembly of claim 1, further comprising:
another stop to limit rotation of the latching member in a second direction opposite the first direction.

9. A computing device latching assembly, comprising:
an accessory having a latching member rotatably coupled to a support plate and a release mechanism coupled to the support plate, the latching member biased to a locking orientation relative to the support plate by a biasing force, and including a hook portion on one side thereof and a surface on an opposite side thereof, and the hook portion configured to engage a portion of a computing device to releasably secure the accessory to the computing device, wherein actuating the release mechanism moves the support plate, moves the latching member from a locking position to an unlocked position and a position beyond the unlocked position, disengages the latching member from the portion of the computing device, contacts the surface of the latching member with another portion of the computing device, rotates the latching member in a first direction against the biasing force, contacts the latching member against a stop of the support plate, and urges the accessory away from the computing device in the first direction as rotation of the latching member in the first direction is limited by the stop.

10. The latching assembly of claim 9, wherein the support plate is slideably disposed within the accessory.

11. The latching assembly of claim 9, wherein the release mechanism is moved from a first position to a second position to move the support plate and move the latching member from the locking position to the unlocked position, and disengage the latching member from the portion of the computing device, and wherein the release mechanism is moved from the second position to a third position to move the support plate and move the latching member from the unlocked position to the position beyond the unlocked position, and rotate the latching member in the first direction, contact the latching member against the stop of the support plate, and urge the accessory away from the computing device in the first direction as rotation of the latching member in the first direction is limited by the stop.

12. The latching assembly of claim 9, wherein the accessory comprises a battery.

13. The latching assembly of claim 9, further comprising:
a first biasing mechanism configured to bias the latching member to the locking position; and
a second biasing mechanism configured to provide the biasing force and bias the latching member to the locking orientation.

14. The latching assembly of claim 9, wherein the hook portion of the latching member engages an opening of the computing device to releasably secure the accessory to the computing device.

15. The latching assembly of claim 9, wherein the support plate includes another stop for limiting rotation of the latching member in a second direction opposite the first direction.

16. A computing device latching assembly, comprising:
an accessory having a latching member rotatably coupled to a support plate and a release mechanism coupled to the support plate, the latching member biased to a locking orientation relative to the support plate by a biasing force, and including a hook portion on one side thereof and a surface on an opposite side thereof, and the hook portion configured to engage a first portion of a computing device to releasably secure the accessory to the computing device, the release mechanism actuated to slide the support plate from a first position to a second position to move the latching member from a locking position to an unlocked position and position the hook portion of the latching member clear of the first portion of the computing device, and the release mechanism further actuated to further slide the support plate from the second position to a third position to move the latching member to a position beyond the unlocked position and cause the surface of the latching member to contact a second portion of the computing device and cause rotation of the latching member in a first direction against the biasing force, wherein rotation of the latching member in the first direction is limited by a stop of the support plate such that the further actuation of the release mechanism moves the accessory away from the computing device in the first direction.

17. The latching assembly of claim 16, wherein the support plate is biased in one direction and the release mechanism is configured to move the support plate in an opposite direction.

18. The latching assembly of claim 16, further comprising:
a first biasing mechanism configured to bias the latching member to engage the first portion of the computing device; and
a second biasing mechanism configured to provide the biasing force and bias the latching member to the locking orientation.

19. The latching assembly of claim 18, wherein the latching member, the support plate, the release mechanism, the first biasing mechanism, and the second biasing mechanism are disposed on the accessory.

20. The latching assembly of claim 16, wherein the support plate includes another stop for limiting an amount of rotational movement of the latching member relative to the support plate in a second direction opposite the first direction.

* * * * *